United States Patent [19]
Davies et al.

[11] Patent Number: 5,322,582
[45] Date of Patent: Jun. 21, 1994

[54] PULTRUDED PART WITH LOCALIZED REGIONS OF DIFFERENT RESIN MATERIALS

[75] Inventors: Lawrence W. Davies, Winnipeg; Leroy Dankochik, Gimli, both of Canada

[73] Assignee: Omniglass Ltd., Winnipeg, Canada

[21] Appl. No.: 983,080

[22] Filed: Nov. 27, 1992

[51] Int. Cl.⁵ .................... B29C 67/14; B29C 67/00
[52] U.S. Cl. .................... 156/180; 156/166; 156/242; 156/245; 156/433; 156/441; 264/137; 264/174; 264/258
[58] Field of Search ............. 156/166, 180, 245, 433, 156/441, 242, 91, 92; 264/258, 257, 134–136, 137, 174

[56] References Cited
U.S. PATENT DOCUMENTS

| | | | |
|---|---|---|---|
| 4,078,348 | 3/1978 | Rothman | 52/192 X |
| 4,681,722 | 7/1987 | Carter et al. | 264/171 |
| 4,752,513 | 6/1988 | Rau et al. | 1156/180 X |
| 4,770,834 | 9/1988 | Nakasone et al. | 156/180 X |
| 4,935,279 | 6/1990 | Perko et al. | 428/211 X |
| 5,024,866 | 6/1991 | Goode | 280/819 X |

*Primary Examiner*—Jeff H. Aftergut
*Attorney, Agent, or Firm*—Adrian D. Battison; Stanley G. Ade; Murray E. Thrift

[57] ABSTRACT

A pultruded part is formed from thermosetting resin which is carried on continuous longitudinal fiber reinforcement into a die which shapes the resin and fibers into the required transverse cross sectional shape and then acts to set the resin. Some of the fibers have applied thereto a second resin material of a different characteristic so that these fibers carry the second resin into the part at localized regions to form localized regions of the second resin extending longitudinally continuously of the part. This allows a resin of an increased strength to be used at areas of increased strength requirement, for example areas of screw fastening, screw ports, junction between two legs and in order to provide a thinner part for reduced thermal transfer.

8 Claims, 2 Drawing Sheets

5,322,582

PULTRUDED PART WITH LOCALIZED REGIONS OF DIFFERENT RESIN MATERIALS

BACKGROUND OF THE INVENTION

This invention relates to a pultruded part and to a method of pultrusion.

Pultrusion is a well known and commonly used technique for forming continuous parts of constant transverse cross-section in which the parts are formed from a set resin material reinforced by longitudinally continuous fibre reinforcement elements.

Generally, although not essentially, the resin material is formed from a thermo-setting resin. The fibre reinforcement elements carrying the resin are passed into a die which forms the resin in liquid form and the fibre reinforcement into the required shape defining the transverse cross-section. After shaping in the die, a heating process is applied to the materials in the die so as to effect thermo setting of the resin material. The part thus emerges from the die in a set condition so that a pulling force can be applied to the part downstream of the die and this pulling force provides the necessary forces for drawing the longitudinally continuous fibrous reinforcement elements through the section in which the resin is applied and into the die. Generally the resin is applied simply by dipping the fibers through a bath of the resin.

The part can be formed simply from rovings which are longitudinally continuous individual fibers formed into a bundle or can include rovings and also a mat structure which is inserted with the rovings into the die. However, in both cases the materials are generally soaked with the resin material prior to entry into the die so the die acts to squeeze the resin material throughout the fibers to ensure an intimate mixture between the fibers and the resin.

In most cases the amount of fiber is of the order of 60 to 70% of the total part so that the resin material is of the order of 30 to 40%. In some oases filler materials can be added.

Different resin materials are available for achieving different effects. In general terms the resins include polyester, vinylester, acrylic materials and epoxy, all of which can be provided in a form which is thermo-setting. It is well known that polyester is currently the cheapest of the available resins but has the disadvantage that it is weak relative to the other resins and thus has a tendency to crack or split when a force is applied to the finished part in a direction transverse to the length of the part. In order to control the economics of the finished product, therefore, it is necessary to make a careful selection of the resin material in relation to the thickness of the part and therefore the quantity of the resin material so that the part is properly designed to achieve the required properties at a required price. It is generally known, therefore, that one of the available resins can be selected and the thickness of the part then controlled to provide the required characteristics.

It is one object of the present invention to provide an improved pultruded part and an improved method for pultrusion which enables the manufacture of a part of the required strength at a reduced price.

According to the first aspect of the invention there is provided a pultruded part comprising an integral part body having a constant cross-section transverse to a longitudinal direction of the body, the body being formed from set resin material having embedded therein fibre reinforciing elements at least some of which are continuous in the longitudinal direction of the body, the body including at one portion of the cross section a first resin material and at a second distinct portion of the cross section a second resin material different from the first resin material, each of said first and second resin materials exending continuously longitudinally of the body and having some of said fibre reinforcing elements embedded therein.

According to a second aspect of the invention there is provided a method of forming a pultruded part comprising an integral body having a constant transverse cross-section, the method comprising providing a plurality of longitudinally continuous fibre reinforcement elements, applying to said elements in liquid form settable resin material, passing the elements and the resin material applied thereto through a die to form the elements and the resin material into a shape defining said transverse cross section and causing the resin material to set in said shape, wherein saie of the fibre reinforcement elements have applied thereto a first resin material and others of the fibre reinforcement elements have applied thereto a second resin material different from the first resin material.

One embodiment of the invention will now be described in conjunction with the accompanying drawings in which:

DETAILED DESCRIPTION

Figure 1:
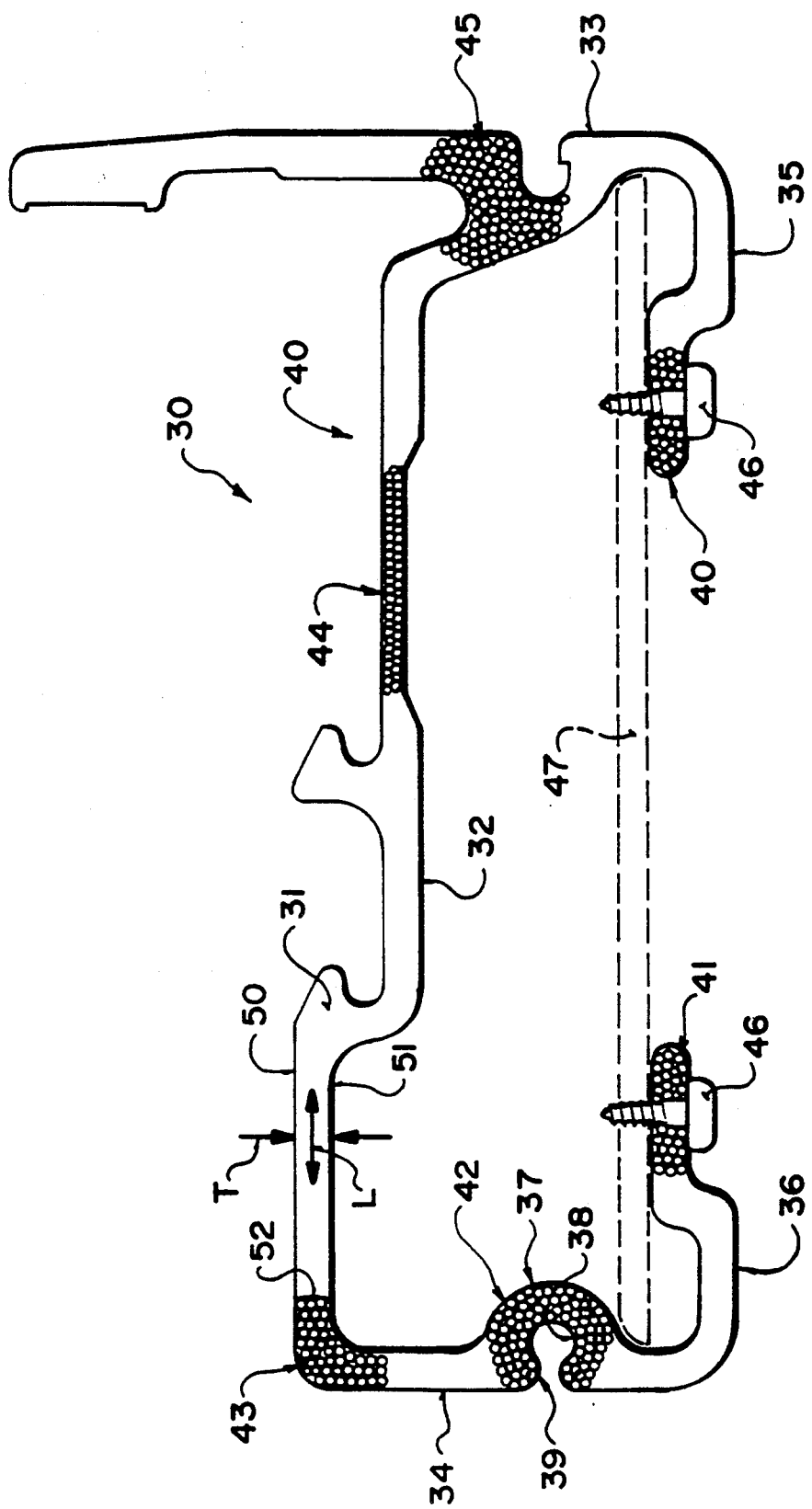
FIG. 1 is an end elevational view of a pultruded part according to the present invention, the part in the example shown forming a window frame.

Turning firstly to the method, there is provided a first bath 10 of a first resin and a second bath 11 of a second resin, both of the resins being thermo-setting. A first supply 12 of continuous fibre reinforcement elements 13 supplies those elements for application to the bath 10. A second supply of fibre reinforcement elements indicated at 14 includes elements 15 arranged for supply to the bath 11. Both the supplies 12 and 14 include roving bobbins 16 and in addition the supply 12 may include a roll of a mat material 17 of conventional form.

The amount of fiber material in the supply 12 is generally significantly greater than that in the supply 14 so that the fiber elements 13 constitute the majority of the fiber elements generally as much as 80 to 90% of the total.

The fiber elements 13 are guided by a conventional guide system including guide bars 18 through the bath 10 where the fiber elements become immersed in the resin 19 to apply the resin to the fiber elements 13 so that the resin fully mixes with the fibers to be carried thereby. The fiber elements in the resin are then guided into a die 20, again of conventional construction which is shaped to form the cross-section of the part and which includes a heating section schematically indicated at 21 for applying heat to the resin carried by the reinforcing fiber elements. The heat acts to set the resin so that it emerges from a rear end 22 of the die in a fully set condition as indicated at 23 where the part may be grasped by rollers 24 for the application of the pulling force acting to pull the fibers and resin through the die.

A cutting station 25 is provided to cut the continuously formed pultruded part to length as required.

In addition to the fiber elements 13 and the resin 19, the fiber elements 15 and a resin 26 in the bath 11 are also fed into the die 20. The fiber elements 15 carrying the resin 26 are guided by a guide system 27 so as to guide the fiber elements 15 to one or more required specific or isolated locations in the shape of the part as defined by the die 20.

The first resin 19 is generally of the most inexpensive type, for example polyester and this is used to form the bulk or majority of the part. The second resin 26 is of a different characteristic and is preferably selected from a type of resin which provides increased strength and particularly resistence to cracking. Such a resin may be selected from acrylic or vinylester resins. All of these resins are commercially available and one skilled in the art will be able to select those which have the required characteristics. As the resin 26 is used only in localized areas as explained hereinafter, a resin of a significantly increased cost can be used without providing a significant cost penalty in the manufacture of the part.

Figure 2:
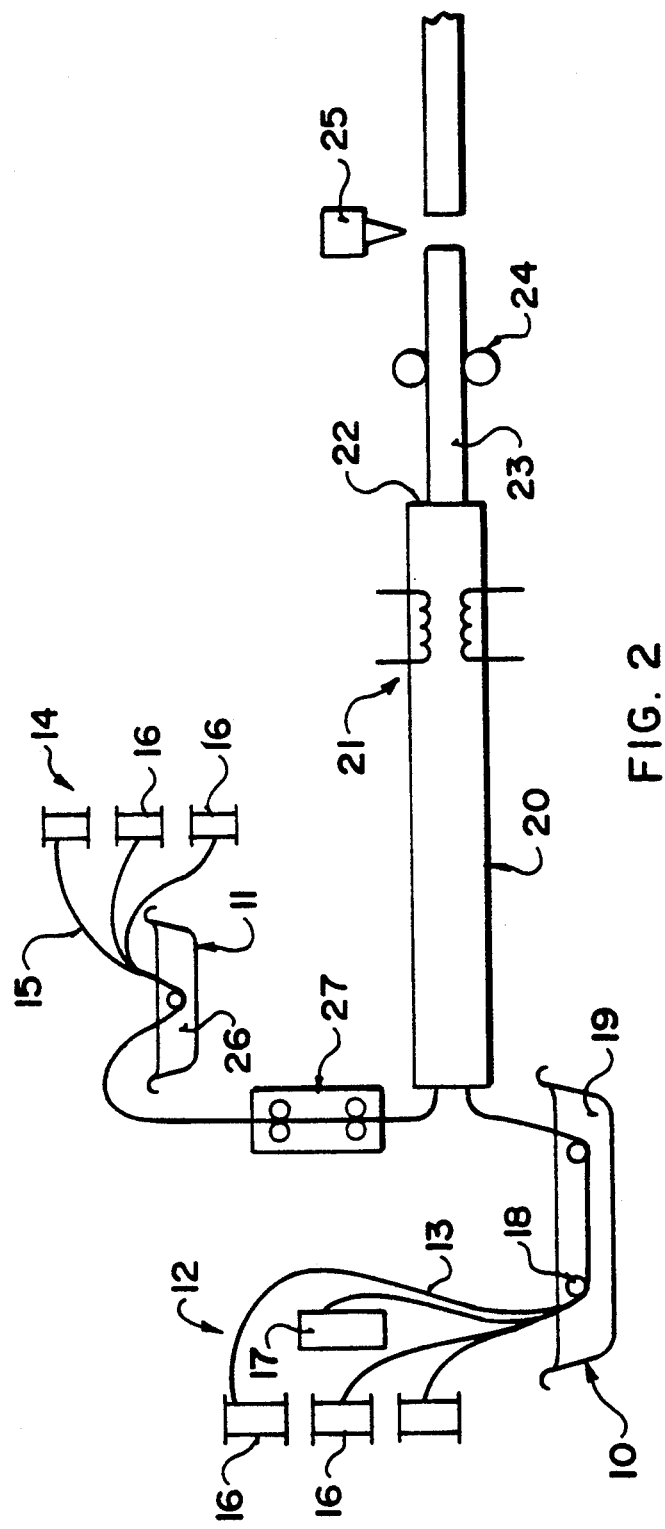
FIG. 2 is a schematic illustration showing the method of pultrusion for forming the part of FIG. 1.

Turning now to FIG. 1, this shows one example of a part which can be formed using the method of FIG. 2. The part is merely an example and many different types of parts can be formed which use only one or more than one of the different types of localized regions as described hereinafter.

The part is shown only in cross section in FIG. 1 and includes a part body shown in end elevational view at 30. It will be appreciated that the part is effectively continuous in length when formed by the pultrusion process prior to cutting to length to form one end face 31 which is defined at one end of the body, of course the end face being the same shape as the cross section.

In the example shown, the part forms a window frame with a web section 32, a first leg 33 arranged to be outside the buiding and a second leg 34 arranged to be inside the building. The legs 33 and 34 and the web 32 are formed integrally by the pultrusion process. At a lower part of each leg 33, 34 is formed an inturned portion 35, 36. At one part of the leg 34 is formed a channel 37 which is cylindrical in shape to form a circular cylindrical inner surface 38 acting as a screw port. The channel 37 is formed as part of the leg 34 so that there is a space 39 between two parts of the leg 34 at which the channel 34 is formed. This is a conventional technique for forming a screw port.

On top of the web 32 is formed a glass receiving section generally indicated at 40 which is of conventional shape and is arranged to receive a sealed window unit (not shown) which sits on the web 32 adjacent the outer leg 33.

The outer leg 33 is thus presented to the cold environment outside of the building while the inner part of the web 32 and the leg 34 are presented inwardly into the building and thus open to the warm environment within the building. This sets up a thermal gradient across the web 32 from the leg 33 inwardly to a position approximately midway across the web 32.

The cross section thus as shown and described above has a first surface 50, a second surface 51, a thickness T between the first and second surfaces which is filled with the fiber reinforcement elements and the resin material, and a length L transverse to the thickness greater than the thickness. The cross section is divided into at least one first region (shown in plain) and at least one second localized region (for example region 43), the first and second regions being located at different portions of the length of the cross section and divided from each other by a transition line 52 between the regions transverse to the length of the cross section. As explained previously, the majority of the part is formed from the fiber reinforcing elements 13 and the resin 19. This area is shown plain. Those localized areas which are formed of the fiber elements 15 and the resin 26 are shown with a cross hatching.

Thus there are six localized areas of the second resin material indicated respectively at 40, 41, 42, 43, 44 and 45. The example shown includes four different types of localized areas as described hereinafter but in other examples it is possible to use only one type or more than one of the types described. In such a situation the proportion of the second resin material will of course be significantly reduced relative to the proportion of the first resin material.

Turning therefore firstly to the localized areas 40 and 41, it will be noted that these each receive a screw 46 which passes through the localized area into a hardware element 47. The purpose of the first type of localized area, that is that shown at 40 and 41, is to receive a screw extending through the thickness of the part in a direction transverse to the length of the part. The second resin material is therefore used in these localized areas to reduce the tendancy of the part to crack or split when the screw, generally of a self-tapping nature, is engaged into and passes through the material of the part.

The second localized area indicated at 42 defines the screw port for receiving a screw extending longitudinally of the part. Again a self-tapping screw (not shown) engages into the cylindrical interior surface of the screw port. The formation of the screw port from the second resin material provides a localized area of increased strength and resistance to cracking which can otherwise be caused by the outward force generated by the entry of the screw.

A third type of localized area is indicated at 43 and 45. The localized areas 43 and 45 each form a junction are between two legs of the part which are arranged at an angle. Thus the localized area 43 forms a junction between two integral legs defined by the leg portion 34 and the web 32. These are arranged at right angles and the leverage effect caused by pushing down on the web or pulling outwardly on the leg 34 can readily cause cracking at the junction therebetween. The formation of the localized area 43 at the junction from the second material therefore reduces this tendency to crack and significantly increases the strength of the part at that location. Similarly the localized area 45 is defined between the web 32 forming a leg on one side and the leg portion 33 on the other side.

Turning now to the localized area 44, this is formed in the web at a position underlying the location of the glass of the sealed window unit. The localized area 44 is again formed from the second material and in this case the thickness of the part at the localized area is reduced. This reduction in the thickness of the part significantly reduces the thermal transmission through the part. The use of the second material at the localized area 44 thus allows the part to be reduced in thickness while providing the same strength and, as explained above, this reduced thickness reduces the thermal transfer under the thermal gradient described before.

The use of the present invention in the formation of window frames is of course only one example, and the technique in providing isolated areas of a second resin material can be used generally in pultrusion techniques for the formation of various different parts. This therefore provides a further design tool which can be used to maximize the strength of the part in relation to a required production cost.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method of forming a pultruded part comprising an integral body having a constant cross section transverse to a length of the body, the method comprising providing a plurality of longitudinally continuous fiber reinforcement elements, applying to said elements in liquid form settable resin material, passing the elements and resin material applied thereto through a die to form the elements and the resin material into a shape defining said transverse cross section and causing the resin material to set in said shape, the cross section having a first surface, a second surface, a thickness between the first and second surfaces which is filled with the fiber reinforcement elements and the resin material, and a length transverse to the thickness greater than the thickness, and the cross section being divided into at least one first region and at least one second localized region, the first and second regions being located at different portions of the length of the cross section and divided from each other by a transition line between the regions transverse to the length of the cross section, the fiber reinforcement elements at said at least one first region of the cross section having applied thereto a first resin material and the fiber reinforcement elements at said at least one second region of the cross section having applied thereto a second region material different from the first resin material.

2. The method according to claim 1 wherein the part is formed mainly from said fiber reinforcement elements which have applied thereto the first resin material and wherein the fiber reinforcement elements which have applied thereto the second resin material are arranged only in at least one localized region of the part.

3. The method according to claim 1 wherein the second resin material is selected such that when set it is more resistant to cracking than the first resin material.

4. The method according to claim 3 wherein the first resin material is polyester and wherein the second resin material is selected from one of vinylester and acrylic materials.

5. A method of forming a pultruded part comprising an integral body having a constant cross section transverse to a length of the body, the method comprising providing a plurality of longitudinally continuous fiber reinforcement elements, applying to said elements in liquid form settable resin material, passing the elements and the resin material applied thereto through a die to form the elements and the resin material into a shape defining said cross section and causing the resin material to set in said shape, wherein at least some of the fiber reinforcement elements have applied thereto a first resin material and others of the fiber reinforcement elements have applied thereto a second resin material different from the first resin material, passing a screw into the integral body in a direction transverse to the length of the body and including resisting cracking of the body at the screw by arranging those fiber reinforcement elements contacting the screw and those in a localized region surrounding the screw to carry said second resin material, the second resin material being selected such that when set it is more resistant to cracking than the first resin material.

6. A method of forming a pultruded part comprising an integral body having a constant cross section transverse to a length of the body, the method comprising providing a plurality of longitudinally continuous fiber reinforcement elements, applying to said elements in liquid form settable resin material, passing the elements and the resin material applied thereto through a die to form the elements and the resin material into a shape defining said cross section and causing the resin material to set in said shape, wherein at least some of the fiber reinforcement elements have applied thereto a first resin material and others of the fiber reinforcement elements have applied thereto a second resin material different from the first resin material, defining at a transverse end face of the integral body a screw port formed by a channel extending longitudinally of the integral body and breaking out at the end face of the body, inserting a screw into the screw port and resisting cracking of the integral body at the channel by arranging those fiber reinforcement elements contacting the screw and those in a localized region surrounding the screw to carry said second resin material, the second resin material being selected such that when set it is more resistant to cracking than the first resin material.

7. A method of forming a pultruded part comprising an integral body having a constant cross section transverse to a length of the body, the method comprising providing a plurality of longitudinally continuous fiber reinforcement elements, applying to said elements in liquid form settable resin material, passing the elements and the resin material applied thereto through a die to form the elements and the resin material into a shape defining said cross section and causing the resin material to set in said shape, wherein at least some of the fiber reinforcement elements have applied thereto a first resin material and others of the fiber reinforcement elements have applied thereto a second resin material different from the first resin material, defining on the integral body a first leg and a second leg at an angle to the first leg, defining between the first and second legs a junction region at which cracking can occur if forces are applied to the integral body tending to change the angle between the first and second legs and resisting cracking at the junction region by forming the junction region from a localized region formed from said second material, the second resin material being selected such that when set it is more resistant to cracking than the first resin material.

8. A method of forming a pultruded part comprising an integral body having a constant cross section transverse to a length of the body, the method comprising providing a plurality of longitudinally continuous fiber reinforcement elements, applying to said elements in liquid form a settable resin material, passing the elements and the resin material applied thereto to a die to form the elements and the resin material into a shape defining said cross section and causing the resin material to set in said shape, forming in the integral body a web, a cross section of the web having a first surface, a second surface, a thickness between the first and second surfaces which is filled with the fiber reinforcement elements and the resin material, and a length transverse to the thickness greater than the thickness, the web having one portion of the web which is of reduced thickness relative to at least one other portion of the web, at least some of the fiber reinforcement elements having applied thereto a first resin material and others of the fiber reinforcement elements having applied thereto a second resin material different from the first resin material, substantially the complete thickness of said one portion of the web being formed from a localized region of said fiber reinforcement elements having applied thereto said second resin material and said at least one other portion of the web being formed from said fiber reinforcement elements having applied thereto said first resin material, the second resin material having increased strength relative to the first resin material so that said one portion of the web, despite its reduced thickness, is of similar strength to that of said at least one other portion of the web.

* * * * *